US012473681B2

(12) United States Patent
Walker et al.

(10) Patent No.: US 12,473,681 B2
(45) Date of Patent: Nov. 18, 2025

(54) SPRAY DEVICE AND METHOD FOR USE THEREOF

(71) Applicants: Brian A. Walker, New Philadelphia, OH (US); Jeff Geman, Sharon, WI (US)

(72) Inventors: Brian A. Walker, New Philadelphia, OH (US); Jeff Geman, Sharon, WI (US)

(*) Notice: Subject to any disclaimer, the term of this patent is extended or adjusted under 35 U.S.C. 154(b) by 545 days.

(21) Appl. No.: 17/968,457

(22) Filed: Oct. 18, 2022

(65) Prior Publication Data

US 2023/0037378 A1 Feb. 9, 2023

Related U.S. Application Data

(63) Continuation of application No. 17/128,621, filed on Dec. 21, 2020, now Pat. No. 11,486,071.

(51) Int. Cl.

| | |
|---|---|
| ***B05B 9/00*** | (2006.01) |
| ***B05B 9/04*** | (2006.01) |
| ***B05B 15/628*** | (2018.01) |
| ***B41M 5/00*** | (2006.01) |
| ***D06B 1/02*** | (2006.01) |
| ***D06B 1/10*** | (2006.01) |
| ***D06B 11/00*** | (2006.01) |
| ***D06P 5/00*** | (2006.01) |
| *B05B 1/30* | (2006.01) |
| *B05B 15/63* | (2018.01) |

(52) U.S. Cl.

CPC .......... *D06B 11/0059* (2013.01); *B05B 9/007* (2013.01); *B05B 9/0403* (2013.01); *B05B 15/628* (2018.02); *B41M 5/0011* (2013.01); *B41M 5/0041* (2013.01); *D06B 1/02* (2013.01); *D06B 1/10* (2013.01); *D06P 5/002* (2013.01); *B05B 1/3053* (2013.01); *B05B 15/63* (2018.02); *D06B 11/0073* (2013.01)

(58) Field of Classification Search

None

See application file for complete search history.

(56) References Cited

U.S. PATENT DOCUMENTS

| | | | | |
|---|---|---|---|---|
| 2,812,211 A * | 11/1957 | Gardner | A63C 19/08 | 239/150 |
| 4,624,602 A * | 11/1986 | Kieffer | E01C 23/22 | 118/305 |
| 6,036,123 A * | 3/2000 | West | B05B 13/0415 | 118/305 |
| 7,367,515 B1 * | 5/2008 | Newman | E01C 23/22 | 404/93 |
| 7,654,771 B2 * | 2/2010 | Schroeder | E01C 23/22 | 404/93 |
| 8,438,695 B2 | 5/2013 | Gilbert, Jr. et al. | | |
| 9,523,166 B2 | 12/2016 | Dolsey et al. | | |
| 10,156,040 B2 | 12/2018 | Dolsey et al. | | |

(Continued)

*Primary Examiner* — Binu Thomas

(57) ABSTRACT

A spray device and a method of using the spray device are provided. The spray device facilitates the application of a liquid such as a pretreatment liquid to an area of a fabric material. The spray device can be positioned on or adjacent portions of the fabric material and/or a substrate supporting the fabric material. The spray device can be activated to spray the pretreatment liquid and move the spray device on portions of the fabric material and/or the substrate supporting the fabric material.

20 Claims, 5 Drawing Sheets

(56) References Cited

U.S. PATENT DOCUMENTS

| | | | |
|---|---|---|---|
| 10,189,278 B1 | 1/2019 | Friedrich et al. | |
| 10,532,585 B2 | 1/2020 | Friedrich et al. | |
| 10,557,232 B2 | 2/2020 | Ohashi et al. | |
| 10,718,087 B2 | 7/2020 | Naruse et al. | |
| 11,517,923 B2 * | 12/2022 | Hartzler .................. | B05B 12/34 |
| 2006/0249039 A1 | 11/2006 | Feldman et al. | |
| 2007/0175175 A1 | 8/2007 | Schwenke et al. | |
| 2013/0079733 A1 | 3/2013 | Burt et al. | |
| 2016/0136675 A1 | 5/2016 | Whitener | |
| 2020/0157367 A1 | 5/2020 | Ben-Zur | |
| 2020/0207096 A1 | 7/2020 | Horie et al. | |
| 2020/0353760 A1 | 11/2020 | Friedrich et al. | |
| 2021/0040684 A1 | 2/2021 | Ajanee et al. | |
| 2021/0197604 A1 | 7/2021 | Shinoda et al. | |

* cited by examiner

SPRAY DEVICE AND METHOD FOR USE THEREOF

The present application is a continuation of U.S. application Ser. No. 17/128,621, filed Dec. 21, 2020; all of which is incorporated by reference herein

FIELD

The present technology generally relates to a spray device for applying a liquid in a controlled manner to a substrate. More particularly, the present technology relates to a spray device facilitating application of a pretreatment liquid to a fabric material or other substrate.

BACKGROUND

Direct-to-garment (DTG) printing processes often require a pretreatment liquid to be applied to fabrics prior to use thereof. The pretreatment liquid is used to facilitate adherence of inks used in the DTG printing processes to the fabrics. In doing so, the pretreatment liquid provides a base that prevents the inks from soaking into the fabrics. The pretreatment liquid also provides increased wash durability for the inks applied to the fabrics by the DTG printing processes. Application of the pretreatment liquid has been accomplished using brushes, rollers, or sprayers. However, smooth, even, and uniform application of the pretreatment liquid to the fabrics is required to provide optimal printing surfaces for the DTG printing processes. Hand application using brushes, rollers, and hand sprayers typically fails to provide the desired smooth, even, and uniform application of the pretreatment liquid. Consequently, relatively large automated mechanical sprayers have been developed to apply the pretreatment liquid. Using these automated mechanical sprayers, either spray head(s) move relative to the fabric, or the fabric is provided over a substrate, and the substrate and the fabric are moved relative to spray head(s). The size and expense of these automated mechanical sprayers can preclude their use in at-home businesses. Therefore, there is a need for a compact spray device for that can be used to provide smooth, even, and uniform application of a pretreatment liquid to fabrics.

SUMMARY

In one aspect, the present disclosure contemplates a method of applying pretreatment liquid to an area of a fabric material, the method including positioning the fabric material on and/or over a substrate; positioning a spray device, for spraying the pretreatment liquid, on portions of the fabric material and/or the substrate; activating the spray device; after activation of the spray device, moving the spray device from a first position on the fabric material and/or the substrate to a second position on the fabric material and/or the substrate; and during activation of the spray device from the first position to the second position, spraying the pretreatment liquid onto the fabric material.

In one aspect, the present disclosure contemplates a method of applying pretreatment liquid to an area of a fabric material, the method including positioning the fabric material on and/or over a substrate; positioning a spray device, for spraying the pretreatment liquid, on portions of the fabric material and/or the substrate; activating the spray device to supply the pretreatment liquid to one or more sprayers attached to the spray device from a reservoir using a pump, to spray the pretreatment liquid from the one or more sprayers onto the fabric material, and to move the spray device from a first position to a second position on the fabric material and/or the substrate as the pretreatment liquid is pumped and sprayed, and adjusting an application rate of the pretreatment liquid by adjusting height(s) of the one or more sprayers attached to the spray device relative to the fabric material and/or the substrate, adjusting a velocity of the spray device during movement thereof from the first position to the second position, and/or adjusting a pressure of the pretreatment liquid from the pump to the one or more sprayers.

In one aspect, the present disclosure contemplates a method of applying pretreatment liquid to an area of a fabric material, the method including positioning a spray device, for spraying the pretreatment liquid, on portions of a fabric material and/or a substrate supporting the fabric material; activating the spray device to spray the pretreatment liquid from one or more onto the fabric material, and to move the spray device from a first position to a second position on the fabric material and/or the substrate as the pretreatment liquid is sprayed, and adjusting an application rate of the pretreatment liquid by adjusting height(s) of the one or more sprayers attached to the spray device relative to the fabric material and/or the substrate, and/or adjusting a velocity of the spray device during movement thereof from the first position to the second position.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
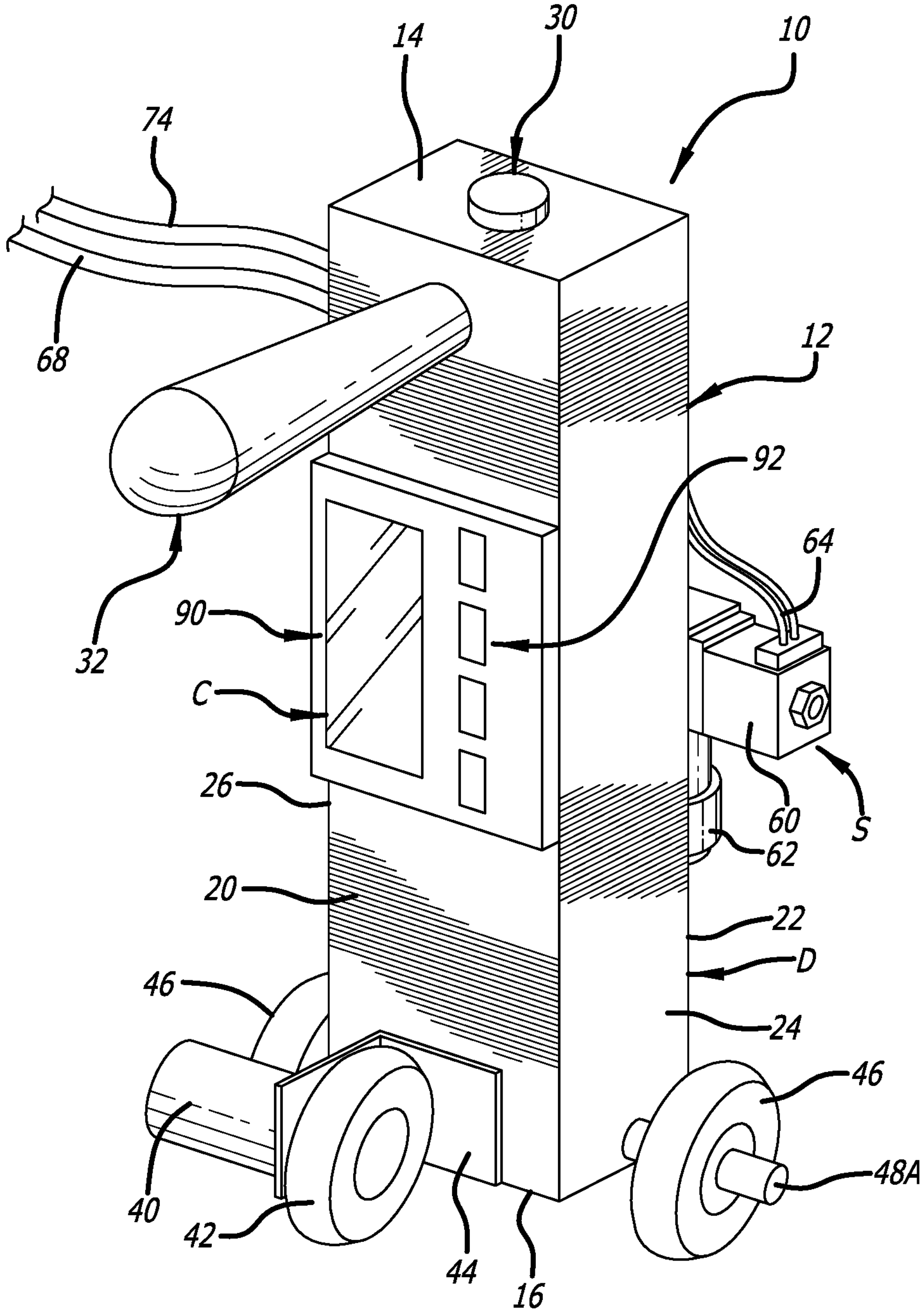
FIG. 1 is a front, top perspective view that illustrates a spray device according to the present disclosure.
Figure 2:
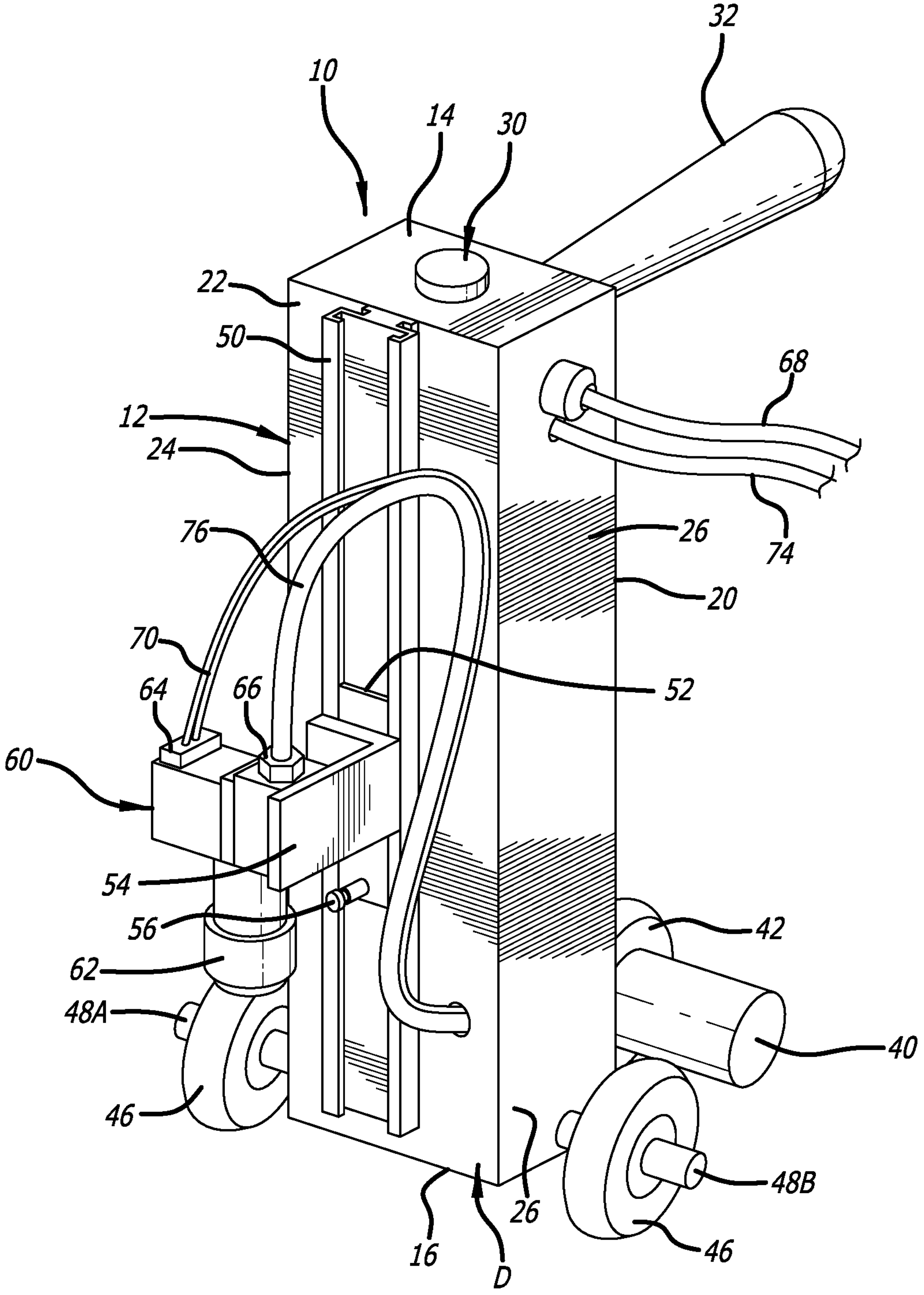
FIG. 2 is a rear, top perspective view that illustrates the spray device of FIG. 1.

As depicted in FIGS. 1 and 2, a spray device 10 includes a housing portion 12 shaped as a rectangular cuboid having a top end surface 14, a bottom end surface 16, a front surface 20, a rear surface 22, a first side surface 24, and a second side surface 26. The housing portion 12 is not limited to being shaped as a rectangular cuboid, and can have a variety of alternative shapes.

The housing portion 12 includes a door D on which the rear surface 22 is provided, and the housing portion 12 includes an interior cavity 28 (FIG. 4) accessible by removing the door D. As discussed below, the interior cavity 28 can include a controller C for controlling operation of the spray device 10 and a pump P for pumping the pretreatment liquid.

An activation button switch 30 can be provided on the top end surface 14, and a handle portion 32 can be extend outwardly from the front surface 20. As discussed below, the activation button switch 30 is used to communicate with the controller C to facilitate activation and deactivation of the spray device 10, and the handle portion 32 can be used to manipulate the position of the spray device 10. To facilitate actuation thereof, the activation button switch 30, for example, can be depressed, tripped, or otherwise engaged. And, although the activation button switch 30 and the handle portion 32 are depicted in FIGS. 1 and 2 as being located on the top end surface 14 and the front surface 20, respectively, the activation button switch 30 and the handle portion 32 can be located on the spray device 10 in other positions convenient to manipulation by a user.

As depicted in FIG. 1, a motor 40 for driving a wheel 42 can be attached relative to the front surface 20 using a bracket 44. The bracket 44 can be attached directly to the front surface 20. As discussed below, operation of the motor 40, for example, can be controlled by the controller C to facilitate activation of the motor 40 to rotate the wheel 42 to facilitate travel of the spray device 10.

Furthermore, as depicted in FIGS. 1 and 2, wheels 46 can be attached relative to the spray device 10 with a first one being attached to the first side surface 24 and a second one being attached to the second side surface 26. The wheels 46 are supported by a first axle 48A relative to the first side surface 24 and a second axle 48B relative to the second side surface 26. Each of the wheels 46 can rotate freely or be driven by a motor or motors (not shown) provided in the interior cavity 28. If the wheels 46 rotate freely, the rotation of the wheel 42 (via rotation thereof by the motor 40) can be used to facilitate travel of the spray device 10. If the wheels 46 are driven by a motor or motors, the motor 40 can be removed, and the wheel 42 can be supported relative to the housing portion 12 to rotate freely. As such, rotation of the wheels 46 (via rotation thereof by the motor or motors) can be used to facilitate travel of the spray device 10.

As discussed below, increasing the speeds of the motor 40 (and/or the other motor or motors) can increase the velocity of the spray device 10, and decreasing the speeds of the motor 40 (and/or the other motor or motors) can decrease the velocity of the spray device 10. Additional wheels or different arrangements of wheels also can be used, so long as the wheels stably support the spray device 10, and at least one of the wheels is driven to facilitate travel of the spray device 10. In place of or in addition to use of wheels, tracks (not shown) can be used to facilitate travel of the spray device 10. The travel of the spray device 10 can be forward, rearward, side-to-side, or other directions, but will typically be forward as defined relative to the front surface 20 and the rear surface 22.

A sprayer S is attached relative to the rear surface 22. As depicted in FIG. 2, the sprayer S can be positioned and repositioned upwardly and downwardly using a track 50 attached to the rear surface 22, and a truck 52 supported by the track 50. A bracket 54 can be used to attach the sprayer S to the truck 52. Furthermore, the truck 52 can be engaged and disengaged from catches (not shown) on the track 50 using a button 56 to facilitate positioning and repositioning the truck 52 (and the sprayer S attached thereto) upwardly and downwardly along the track 50. As such, the height of the sprayer S can be altered using the track 50 and the truck 52.

As depicted in FIG. 2, the sprayer S includes a housing portion 60, spray nozzle(s) 62, a electrical connection 64, and a fluid liquid connection 66. The housing portion 60 can be attached to the bracket 54, and the housing portion 60 can include an interior cavity (not shown) containing a solenoid valve (not shown). As discussed below, the controller C can be electrically connected via the electrical connection 64 to the solenoid valve, and the pump P can be fluidly connected via the fluid connection 66 to the solenoid valve. The electrical connection 64 (via wire(s) (not shown) extending through the interior cavity of the housing portion 60) can be connected to the solenoid valve, and the fluid connection 66 (via tube(s) (not shown) extending through the interior cavity of the housing portion 60) also can be connected to the solenoid valve. The energization and corresponding opening of the solenoid valve can be controlled by the controller C via the electrical connection 64 and the wire(s) extending through the housing portion 60, and the pretreatment received from the pump P via the fluid connection 66 and the tube(s) extending through the housing portion 60 can be released to the spray nozzle(s) 62 when the solenoid valve is energized.

One or more of the spray nozzle(s) 62 can be used to facilitate application of the pretreatment. The spray nozzle(s) 62 can include fixed sizes and fixed shapes, or can be adjustable to increase or decrease the focus of a corresponding area of the spray pattern. The spray nozzle(s) 62 having fixed sizes and fixed shapes could be interchangeable with other nozzle(s) having different fixed sizes and fixed shapes to provide different spray patterns. Furthermore, if more than one of the spray nozzle(s) 62 are provided, the spray nozzle(s) can be arranged in an array to increase the corresponding area of the spray pattern and corresponding application of the pretreatment liquid. Also, the angles of the spray nozzle(s) 62 can be altered to adjust the application of the pretreatment liquid.

As depicted in FIG. 1, a single, adjustable spray nozzle 62 is provided that is adjustable to increase the focus to provide smaller spray area and decrease the focus to provide larger spray area. As discussed below, the spray pattern provided by the nozzle(s) 62 is preferably adjustable to increase or decrease the width thereof in a direction perpendicular to the direction of travel of the spray device 10.

Figure 4:
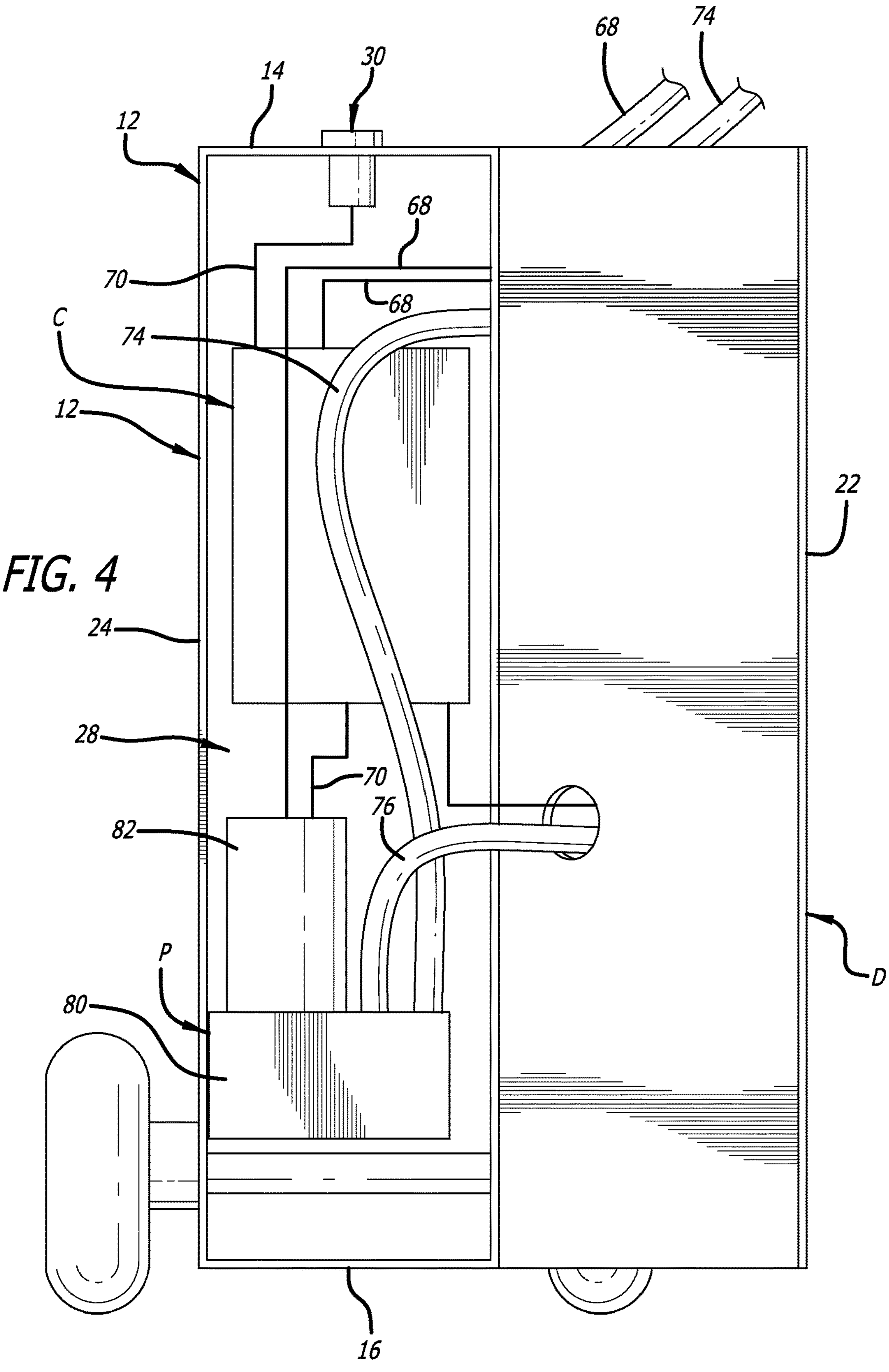
FIG. 4 is an elevational view of an interior portion of the spray device of FIG. 1.

As depicted in FIG. 4, the interior cavity 28 of the housing portion 12 includes the controller C and the pump P. The controller C and the pump P can be supplied with power by a battery (not shown) or an AC or DC power source (not shown) provided inside or outside the housing portion 12. Typically, the output of the AC power source will have to be converted to DC before use with the spray device 10. Wires(s) 68 can be used to connect the battery or other DC power source to the controller C and the pump P. The controller C can be electrically connected to and supply power to the motor 40 (and/or the other motor or motors), the pump P, and the electrical connection 64 via wire(s) 70 extending through and out of the interior cavity 28. The wire(s) 70 can also electrically connect the controller C to the button 30.

A fluid reservoir (not shown) filled with pretreatment fluid can be fluidly connected to the pump P. The fluid reservoir can be provided inside or outside of the housing portion 12. The fluid reservoir can be connected to the pump P via tube(s) 74 extending through and out of the interior cavity 28, and the pump P can be connected to the fluid connection 66 via tube(s) 76 extending through and out of the interior cavity 28. As depicted in FIG. 4, the pump P can include a pump body 80 having an impeller (not shown) and a motor 82 for driving the impeller. As discussed below, operation of the pump P, for example, can be controlled by the controller C to facilitate activation of the motor 82 to rotate the impeller to facilitate transfer of the pretreatment liquid from the fluid reservoir to the sprayer S. As discussed below, the speed of the motor 82 can be increased to increase the pressure of the pretreatment liquid exiting the pump P and supplied to the sprayer S, and can be decreased to decrease the pressure of the pretreatment liquid existing the pump P and supplied to the sprayer S. Typically, the pressure of the pretreatment liquid provided by the pump P can range from 30 psi to 100 psi, but can be lower or higher as deemed necessary.

After actuation of the button switch 30, the controller C can be used to active the motor 40 (and/or the other motor or motors) to rotate the wheel 42 or the wheels 46 to facilitate travel of the spray device 10, activate the motor 82 of the pump P to pump the pretreatment liquid from the fluid reservoir to the sprayer S, and to activate the solenoid valve of the sprayer S to release the pretreatment to the nozzle(s).

In one preferred embodiment, for example, the spray device 10 can be set in an operational mode where it is necessary to hold down the button switch 30 in an actuated position in order to activate, via the controller C, the motor 40 (and/or the other motor or motors) and the motor 82 at predetermined speeds (to provide selected velocities of the spray device 10 and selected pressures of the pretreatment liquid), and opening of the solenoid valve of the sprayer S. Once the button switch 30 is released for this preferred embodiment, the motor 40 (and/or the other motor or motors) and the motor 82 stop, and the solenoid valve of the sprayer S closes.

In another preferred embodiment, for example, the spray device 10 can be set in an operational mode where actuation of the button switch 30 (without the need to hold it down) causes the controller C to activate the motor 40 (and/or the other motor or motors) and the motor 82 at predetermined speeds (to provide selected velocities of the spray device 10 and selected pressures of the pretreatment liquid) and for predetermined times, and to activate opening of the solenoid valve of the sprayer S for a predetermined time.

The controller C can include a display 90 and a keypad 92 for selecting between the above-discussed operational modes, and for adjusting the desired velocity of the spray device 10 and the desired pressure of the pretreatment liquid during these operational modes by controlling the speeds of the motor 40 (and/or the other motor or motors) and the motor 82. Furthermore, as discussed above, the sizes, shapes, number, arrangement, and adjustability of the spray nozzle(s) 62, and the height(s) of the spray nozzle(s) 62 can be adjusted. The sizes, shapes, number, arrangement, and adjustability of the spray nozzle(s) 62 and the corresponding spray pattern of the spray nozzle(s) 62, the height(s) of the spray nozzle(s) 62 from the medium, the velocity of the spray device 10 controlled by the speed of the motor 40 (and/or the other motor or motors), the pressure of the pretreatment liquid controlled by the speed of the motor 82, and the activation times of the motor 82, the motor 40 (and/or other motor or motors), and the solenoid of the sprayer S determine an application rate of the pretreatment liquid to the medium. In other words, these variables determine the amount of the pretreatment liquid applied to an area of the medium during a given time period.

The application rate can be increased by decreasing the size of the spray pattern of the spray nozzle(s) 62, decreasing the height of the spray nozzle(s) 62, increasing the pressure of the pretreatment liquid exiting the pump P by increasing the speed of the motor 82, and decreasing the velocity of the spray device 10 by decreasing the speed of the motor 40 (and/or the other motor or motors). Furthermore, the application rate can be decreased by increasing the size of the spray pattern of the spray nozzle(s) 62, increasing the height of the spray nozzle(s), decreasing the pressure of the pretreatment liquid exiting the pump P by decreasing the speed of the motor 82, and increasing the velocity of the spray device 10 by increasing the speed of the motor 40 (and/or the other motor or motors). By optimizing these variables, a desired amount of pretreatment liquid can be applied to a desired area of the medium during a given time period, while simultaneously limiting overspray, splatter, and bounce-back of the pretreatment liquid. Typically, an amount of the pretreatment liquid ranging from 10 g to 40 g will be applied over a spray area on a fabric material, but the amount of pretreatment liquid can be lower or higher as deemed necessary.

Figure 3A:
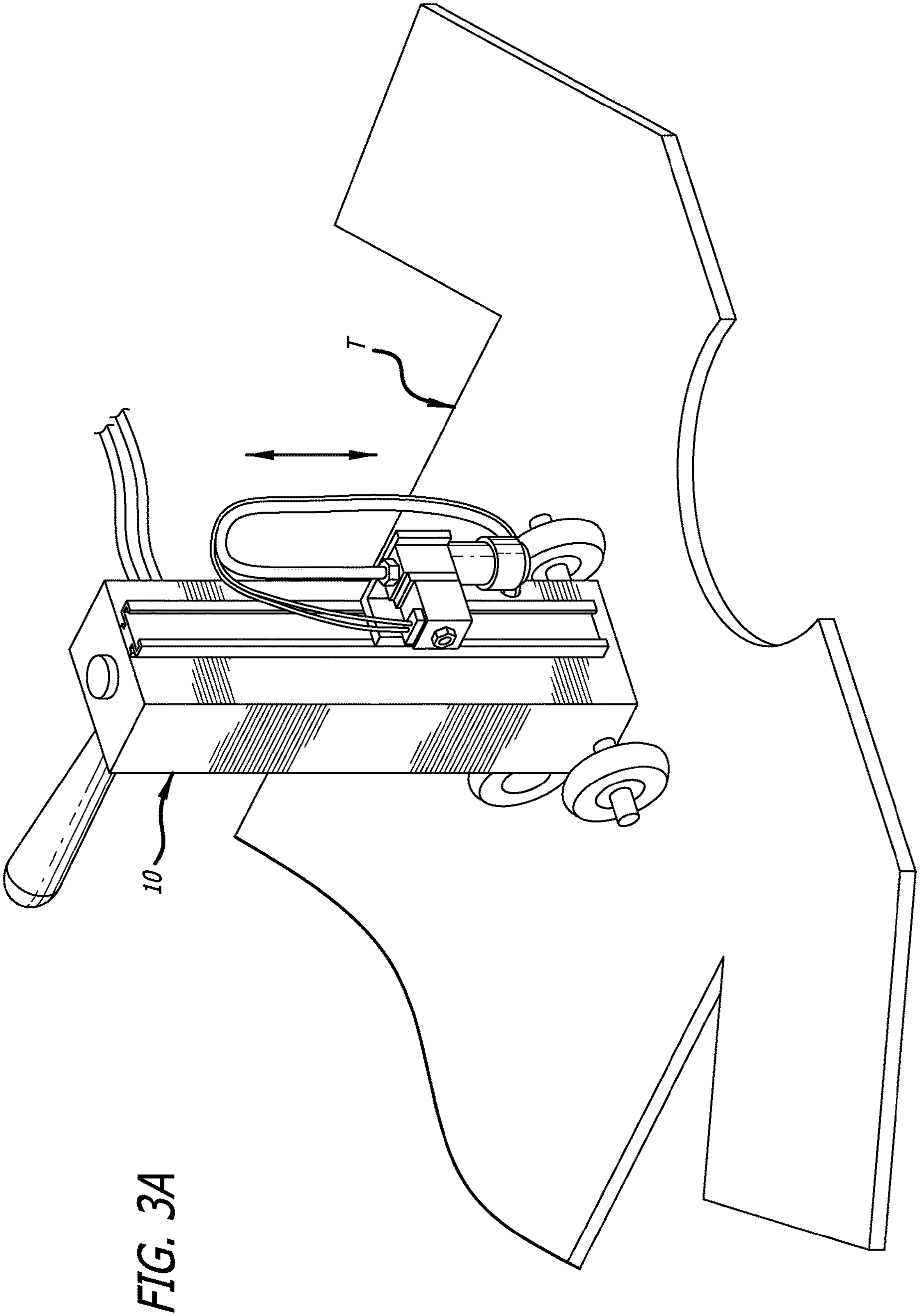
FIG. 3A is a rear, top perspective view of the spray device of FIG. 1 positioned on a t-shirt in a first position prior to spraying pretreatment liquid on the t-shirt.
Figure 3B:
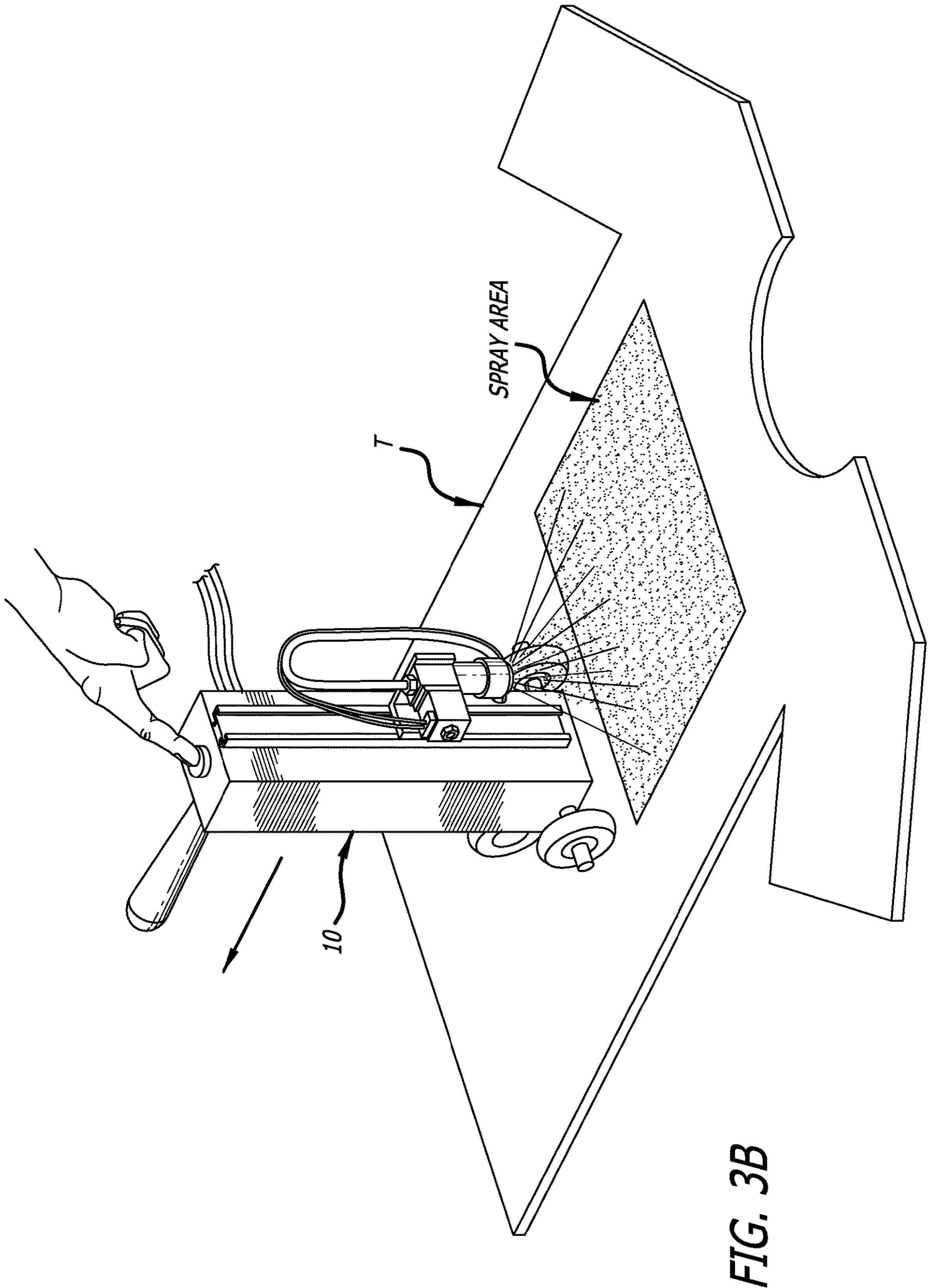
FIG. 3B is a rear, top perspective view of the spray device of FIG. 1 positioned on the t-shirt in a second position after spraying the pretreatment liquid on the t-shirt.

Use of the spray device 10 affords application of the pretreatment liquid to the medium in a controlled and predictable manner that serves in maximizing wetting of the medium for the desired amount of pretreatment. The spray device 10, for example, can be used to apply the pretreatment liquid to the fabric material such as a t-shirt T. The t-shirt T can be positioned over a substrate (not shown), and the substrate and t-shirt positioned thereon can be placed on another substrate such as a table/platen (not shown). The spray device 10 can then be positioned directly on the t-shirt T (FIGS. 3A and 3B), and/or on the table/platen. For example, while the spray device 10 is depicted in FIGS. 3A and 3B as being positioned directly on the t-shirt T, the spray device 10 also can be positioned such that some of the wheels 42 and 46 are on some combination of the t-shirt T, the table, or the platen. As such, the spray device 10 could be configured such that the wheels 42 and 46 can be located on the table and/or the platen, and the sprayer S extends or is extendable out from the housing portion 12 such that it can be positioned over the T-shirt T with the wheels 42 and 46 positioned on the table and/or the platen. With such an configuration, the wheels 42 and 46 can travel solely over the table and/or the platen while the pretreatment liquid is sprayed onto the t-shirt or other fabric material.

Placement of the spray device 10 by the user affords accurate positioning of the spray nozzle(s) 62 relative to the fabric of the t-shirt T. The user can manipulate the keypad 92 to select the mode of operation. The desired rate of application can be determined, and the size of the spray pattern of the spray nozzle(s) 62, the height of the spray nozzle(s) 62, the velocity of the spray device 10, and the pressure of the pretreatment liquid can be adjusted to provide the desired rate of application. As discussed above, the controller C can be configured to adjust the velocity of the spray device 10 and the pressure of the pretreatment liquid according to input from the user. Thereafter, as depicted in FIGS. 3A and 3B, the spray device 10, after positioning on the t-shirt T can be activated to spray a desired volume of the pretreatment liquid to spray area on the t-shirt T. When spraying the pretreatment liquid, the device 10 moves from a first position (FIG. 3A) to a second position (FIG. 3B).

While the spray device 10 has been described above as being used to spray a pretreatment liquid, the spray device 10 is not limited thereto. Other liquids requiring application in the manner of the pretreatment liquid can be used with the spray device 10.

It should be understood that various aspects disclosed herein may be combined in different combinations than the combinations specifically presented in the description and the accompanying drawings. It should also be understood that, depending on the example, certain acts or events of any of the processes of methods described herein may be performed in a different sequence, may be added, merged, or left out altogether (e.g., all described acts or events may not be necessary to carry out the techniques).

We claim:

1. A portable spray device for spraying pretreatment liquid to an area of a fabric shirt, the portable spray device comprising:

a housing portion having a leading end, a trailing end, a first lateral side, and a second lateral side, a first wheel positioned at the first lateral side of the housing portion, and having a first axis of rotation, a second wheel positioned at the second lateral side of the housing portion, and having a second axis of rotation, at least a third wheel positioned at the leading end of the housing portion, and having a third axis of rotation, at least one motor attached to the housing portion for rotating the first wheel and the second wheel, a sprayer attached to the housing portion at the trailing end thereof, and being configured to spray the pretreatment liquid therefrom, and a controller configured to activate the at least one motor to rotate the first wheel and the second wheel, and configured to activate the sprayer to spray the pretreatment liquid therefrom, wherein, when the first wheel, the second wheel, and the third wheel are positioned on a portion of the fabric shirt, the controller is configured to activate rotation of the first wheel and the second wheel to move the portable spray device from a first position on the fabric shirt to a second position on the fabric shirt, and to simultaneously operate the sprayer to spray the pretreatment liquid in a spray area on the fabric shirt during movement of the portable spray device from the first position to the second position, and when the first wheel, the second wheel, and the third wheel are contacted to the fabric shirt, a first plane perpendicular to the first axis of rotation passes through the first wheel and the spray area, a second plane perpendicular to the second axis of rotation passes through the second wheel and the spray area, and a third plane perpendicular to the third axis of rotation passes through the third wheel, through the spray area, and is positioned between the first plane and the second plane.

2. The portable spray device of claim 1, wherein the sprayer is adjustably attached to the housing portion to afford upward and downwardly positioning of the sprayer relative to the fabric shirt.

3. The portable spray device of claim 1, wherein the controller is configured to adjust a velocity of the spray device during movement thereof from the first position to the second position, and/or a pressure of the pretreatment liquid from a pump to the sprayer.

4. The portable spray device of claim 1, further comprising an activation button, and wherein the portable spray device is activated by continuously depressing the activation button to activate the controller to control the moving of the spray device and to cause the spraying of the pretreatment liquid.

5. The portable spray device of claim 1, further comprising an activation button, and wherein the portable spray device is activated by depressing the activation button to activate the controller to control the moving of the spray device for a predetermined distance and the spraying of the pretreatment liquid for a predetermined time.

6. The portable spray device of claim 5, wherein the controller is configurable to vary at least one of the predetermined distance and the predetermined time.

7. The portable spray device of claim 1, further comprising a pump and a reservoir containing the pretreatment liquid, and wherein the sprayer is supplied with the pretreatment liquid from the reservoir using the pump.

8. The portable spray device of claim 7, wherein the reservoir is provided inside or outside of the spray device.

9. The portable spray device of claim 7, wherein the pump is provided inside or outside of the spray device.

10. A portable spray device for spraying pretreatment liquid to an area of a fabric shirt, the portable spray device comprising:

a housing portion having a leading end, a trailing end, a first lateral side, and a second lateral side, a first wheel positioned at the first lateral side of the housing portion, a second wheel positioned at the second lateral side of the housing portion, at least a third wheel positioned at the leading end of the housing portion, at least one motor attached to the housing portion for rotating the first wheel and the second wheel, a sprayer attached to the housing portion at the trailing end thereof, and being configured to spray the pretreatment liquid therefrom, and a controller configured to activate the at least one motor to rotate the first wheel and the second wheel, and configured to activate the sprayer to spray the pretreatment liquid therefrom, wherein the third wheel includes an axis of rotation, a plane perpendicular to the axis of rotation passes through the third wheel, and the plane passes between the first wheel and the second wheel, and wherein, when the first wheel, the second wheel, and the third wheel are positioned on a portion of the fabric shirt, the controller is configured to activate rotation of the first wheel and the second wheel to move the portable spray device from a first position on the fabric shirt to a second position on the fabric shirt, and to simultaneously operate the sprayer to spray the pretreatment liquid in a spray area on the fabric shirt during movement of the portable spray device from the first position to the second position.

11. The portable spray device of claim 10, wherein the sprayer is adjustably attached to the housing portion to afford upward and downwardly positioning of the sprayer relative to the fabric shirt.

12. The portable spray device of claim 10, wherein the controller is configured to adjust a velocity of the spray device during movement thereof from the first position to the second position, and/or a pressure of the pretreatment liquid from a pump to the sprayer.

13. The portable spray device of claim 10, further comprising an activation button, and wherein the portable spray device is activated by continuously depressing the activation button to activate the controller to control the moving of the spray device and to cause the spraying of the pretreatment liquid.

14. The portable spray device of claim 10, further comprising an activation button, and wherein the portable spray device is activated by depressing the activation button to activate the controller to control the moving of the spray device for a predetermined distance and the spraying of the pretreatment liquid for a predetermined time.

15. The portable spray device of claim 14, wherein the controller is configurable to vary at least one of the predetermined distance and the predetermined time.

16. The portable spray device of claim 10, further comprising a pump and a reservoir containing the pretreatment liquid, and wherein the sprayer is supplied with the pretreatment liquid from the reservoir using the pump.

17. A portable spray device for spraying pretreatment liquid to an area of a fabric shirt, the portable spray device comprising:

a leading end, a trailing end, a first lateral side, and a second lateral side, a first wheel positioned at the first lateral side, a second wheel positioned at the second lateral side, at least a third wheel positioned at the leading end, at least one motor attached to the housing portion for rotating the first wheel and the second wheel, a sprayer provided at the trailing end, and being configured to spray the pretreatment liquid therefrom, and a controller configured to activate the at least one motor to rotate the first wheel and the second wheel, and configured to activate the sprayer to spray the pretreatment liquid therefrom, wherein the third wheel includes an axis of rotation, a plane perpendicular to the axis of rotation passes through the third wheel, and the plane passes between the first wheel and the second wheel, and wherein, when the first wheel, the second wheel, and the third wheel are positioned on a portion of the fabric shirt, the controller is configured to activate rotation of the first wheel and the second wheel to move the portable spray device from a first position on the fabric shirt to a second position on the fabric shirt, and to simultaneously operate the sprayer to spray the pretreatment liquid in a spray area on the fabric shirt during movement of the portable spray device from the first position to the second position.

18. The portable spray device of claim 17, further comprising an activation button, and wherein the portable spray device is activated by continuously depressing the activation button to activate the controller to control the moving of the spray device and to cause the spraying of the pretreatment liquid.

19. The portable spray device of claim 17, further comprising an activation button, and wherein the portable spray device is activated by depressing the activation button to activate the controller to control the moving of the spray device for a predetermined distance and the spraying of the pretreatment liquid for a predetermined time.

20. The portable spray device of claim 19, wherein the controller is configurable to vary at least one of the predetermined distance and the predetermined time.

* * * * *